United States Patent [19]

Oilschlager, Jr.

[11] Patent Number: 4,868,906
[45] Date of Patent: Sep. 19, 1989

[54] CENTRIFUGALLY ACTIVATED SWITCH FOR A SYNCHRONOUS GENERATING SYSTEM

[75] Inventor: James D. Oilschlager, Jr., Rockford, Ill.

[73] Assignee: Sundstrand Corporation, Rockford, Ill.

[21] Appl. No.: 119,176

[22] Filed: Nov. 10, 1987

[51] Int. Cl.$^4$ ............................................ H02K 47/04
[52] U.S. Cl. ................................... 310/113; 310/68 D; 310/68 E; 310/72; 310/102 R; 310/165; 200/80 R; 322/47
[58] Field of Search .................... 310/113, 114, 102 R, 310/162, 163, 165, 166, 72, 68 D, 68 E, 68 R, 89; 200/80 R; 318/325, 793; 322/47, 100, 68

[56] References Cited

U.S. PATENT DOCUMENTS

| | | |
|---|---|---|
| 1,324,573 | 12/1919 | Turbayne . |
| 1,644,467 | 9/1921 | Fortescue . |
| 1,773,843 | 8/1930 | Neuland .......................... 310/102 R |
| 1,853,865 | 6/1930 | Kingston . |
| 1,952,450 | 3/1934 | McCormick ..................... 310/102 R |
| 2,394,283 | 3/1943 | Yost . |
| 2,628,294 | 2/1953 | Bone . |
| 2,793,023 | 5/1957 | Gaubatz . |
| 2,858,502 | 10/1958 | Lowry, Jr. et al. . |
| 3,013,132 | 12/1961 | Merchant . |
| 3,032,701 | 5/1962 | Krausz . |
| 3,217,229 | 11/1965 | Ballard . |
| 3,290,582 | 12/1966 | Roosma et al. . |
| 3,316,371 | 4/1967 | Nelson ............................. 200/80 R |
| 3,369,171 | 2/1968 | Lane . |
| 3,388,315 | 6/1968 | Yarrow . |
| 3,539,906 | 11/1970 | Habock . |
| 3,609,426 | 9/1971 | Gaul ................................... 310/113 |
| 3,881,143 | 4/1975 | Fannin et al. . |
| 3,984,647 | 10/1976 | Sakakibara et al. . |
| 4,138,629 | 2/1979 | Miller ................................. 310/113 |
| 4,156,172 | 5/1979 | Hucker et al. . |
| 4,329,603 | 5/1982 | Ballard ............................. 310/68 D |
| 4,336,472 | 6/1982 | Czech ............................... 200/80 R |
| 4,451,775 | 5/1984 | Phillips et al. . |

FOREIGN PATENT DOCUMENTS

| | | | |
|---|---|---|---|
| 2340828 | 2/1975 | Fed. Rep. of Germany ...... 310/165 |
| 0550946 | 2/1943 | United Kingdom ............ 310/102 R |

Primary Examiner—R. Skudy
Attorney, Agent, or Firm—Wood, Dalton, Phillips, Mason & Rowe

[57] ABSTRACT

When operating a synchronous machine as a synchronous generator, a suppression resistor is required across the main generator field. However when operating the synchronous machine as an induction motor, a current is induced in the main generator field which is typically greater than the current carrying capability of the suppression resistor.

In order to overcome the foregoing problem, the present invention provides a centrifugally activated switch for mounting on a rotor and which provides an alternate current path for the induced current. The switch comprises a housing, a shaft rotatable with the housing an axially stationary contactor rotatable carried by the housing, an axially movable contactor slidably carried by the shaft housing, the axially movable contactor axially movable between first and second positions along the shaft, one of the positions being in non-sliding contact with the stationary contactor and the other of the positions being in non-contact with the stationary contactor, a spring for axially biasing the movable contactor towards one of the positions and fly weights for axially biasing the movable contactor towards the other of the positions in response to rotation of the housing to overcome the spring when the housing reaches a predetermined angular velocity and move the movable contactor to the other position.

8 Claims, 2 Drawing Sheets

CENTRIFUGALLY ACTIVATED SWITCH FOR A SYNCHRONOUS GENERATING SYSTEM

FIELD OF THE INVENTION

The present invention relates to a centrifugally activated switch and, more particularly, to a centrifugally activated switch for a synchronous generating system.

BACKGROUND OF THE INVENTION

As is well known in the art, a brushless synchronous generating system typically includes a permanent magnet generator (PMG), an exciter and a main generator. The PMG develops an alternating current which is rectified to energize the exciter field, inducing an AC current in the exciter armature. The exciter armature current is rectified to energize the main generator field, inducing an AC current in the main generator armature.

The brushless generating system can also be operated as an induction motor, as for starting an aircraft engine. A source of starting power can be external electrical power from an auxiliary power unit (APU) or another generator being driven by a previously started engine.

When the generating system is operating as a synchronous generator, a relatively large suppression resistor is required across the main generator field to suppress a voltage induced across the main generator field resulting from rectifier switching.

When the generating system is operating as an induction motor, an AC current is induced in the main generator field. Because the rectifier coupling the main generator field and the exciter conducts only during the half cycle that it is forward biased and the suppression resistor conducts during the half cycle that the rectifier is reversed biased, a pulsating DC current is developed in the main generator field.

In order to start the machine as an induction motor, however, an alternating current must circulate through the main generator field. Further, the suppression resistor is typically not sized sufficiently to dissipate the power during the half cycle that the rectifier is reverse biased and not conducting. Therefore, an alternate current path is necessary to pass the induced current when the generating system is operated as an induction motor. The rectifier must also be protected from a high reverse bias voltage induced across the alternate current path.

The present invention is directed to overcoming one or more of these problems.

SUMMARY OF THE INVENTION

It is the principal object of this invention to provide an improved centrifugal switch for a synchronous machine operable as both a synchronous generator and an induction motor.

According to the present invention, a centrifugally activated switch is provided for mounting on a rotor of the synchronous machine.

The switch comprises a housing adopted for rotation with the rotor, a shaft rotatable with the housing, a flyweight assembly, an axially stationary contactor rotatably carried by the housing and an axially movable contactor slidably carried by the shaft. The axially movable contactor is movable between first and second positions along the shaft, one of the positions being in a non-sliding contacting relationship with the stationary contactor and the other of the positions being in a non-contact relationship with the stationary contactor. The switch further comprises first means including the flyweight assembly for axially biasing the movable contactor toward one of the positions and second means for axially biasing the movable contactor toward the other of the positions in response to rotation of the housing to overcome the first biasing means when the housing reaches a predetermined angular velocity and move the movable contactor to the other position.

In a preferred embodiment the switch includes means for adjusting the predetermined angular velocity at which the second biasing means moves the movable contactor to other position.

The switch further includes means for directing fluid in the housing to facilitate extinguishment of any electrical arc created when the movable contactor moves from a contacting relationship to a non-contacting relationship with the stationary contactor.

It is a further object of this to provide a machine operable both as a synchronous generator for generating electricity and an induction motor for accelerating the machine to synchronous speed. The machine comprises a rotor, an exciter having an armature rotatable with the rotor and a stationary field, a main generator having a field rotatable with the rotor and a stationary armature, a rectifier assembly coupled between the exciter armature and the main generator generator field, and a circuit coupled between the rectifier assembly and the generator field to present a high resistance across the main generator field when the machine is operating as a generator and a low resistance across the main generator field when the machine is operating as an induction motor.

The circuit includes a first resistor coupled across the main generator field and in parallel with the switch.

The circuit further includes a second resistor coupled in series with the switch.

Other features and advantages of the present invention will be apparent from the following description taken in connection with the accompanying drawings.

DESCRIPTION OF THE PREFERRED EMBODIMENT

Figure 1:
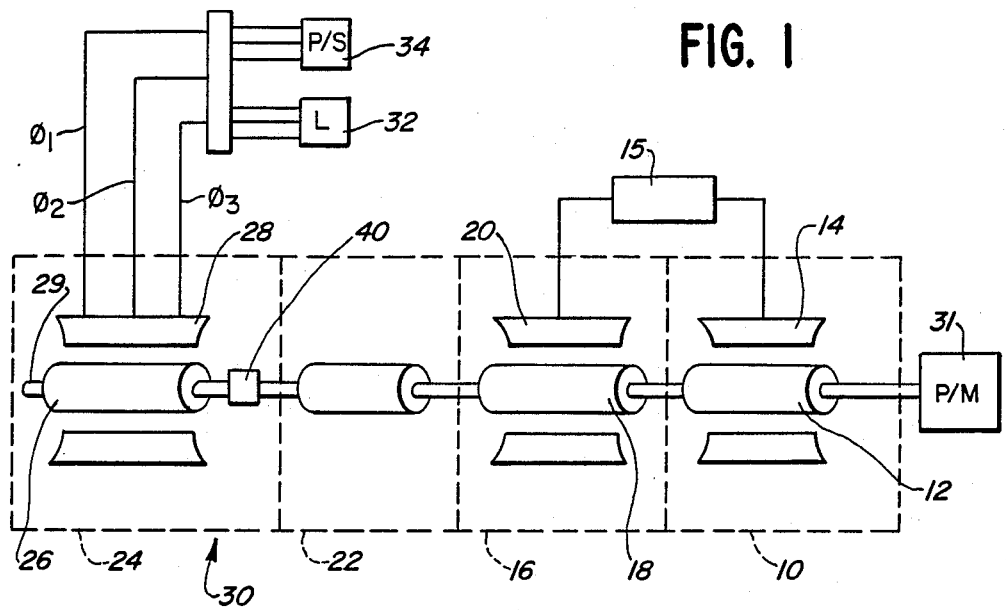
FIG. 1 is a mechanical schematic of a synchronous machine operable both as a synchronous generator and an induction motor employing a switch made according of the invention.

A machine operable both as a synchronous generator or an induction motor is illustrated in FIG. 1. The machine includes a permanent magnet generator (PMG) 10 having a rotating permanent magnet assembly 12 and a stationary PMG armature 14, a first rectifier assembly 15, and exciter 16 having a rotating exciter armature 18 and a stationary exciter field 20, a second rotating rectifier assembly 22 and a main generator 24 having a rotating main generator field 26 and a stationary main generator armature 28. Thus the permanent magnet assembly 12, exciter armature 18, rotating rectifier assembly 22 and main field 26 define a rotor, generally designated 29, rotatable within a stator, generally designated 30, in turn including the PMG armature 14, exciter field 20 and main generator armature 28.

When the machine is operating as a synchronous generator, a rotary output prime mover 31 drives the rotor 29.

As is well known in the art, rotation of the permanent magnet assembly 12 induces an AC current in the PMG armature 14. The induced AC current is rectified by the first rectifier assembly 15, and the rectified current excites the exciter field 20. The exciter field 20 induces an AC current in the rotating exciter armature 18, which is rectified by the rotating rectifier assembly 22 to excite the main generator field 26.

The rotating main generator field 26 induces a three phase output in the main generator armature 28 to power a load 32.

When operating as an induction motor, an external electrical power supply 34 energizes the main generator armature 28, establishing a torque and causing the main generator field 26 and the remainder of the rotor 29 to rotate.

Figure 2:
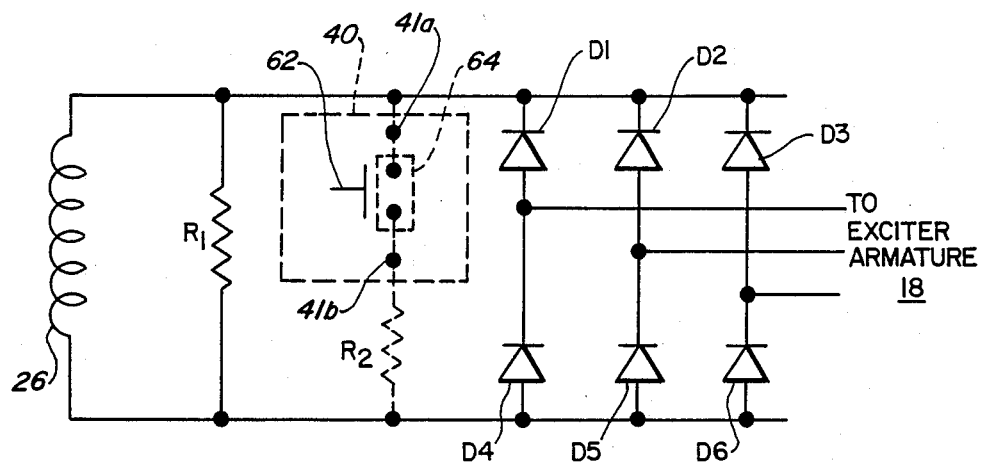
FIG. 2 is an electrical schematic representation of a circuit used in the machine.

In accordance with this invention, a circuit 36 is coupled between the rotating rectifier assembly 22 and the main generator field 26, as illustrated in FIG. 2. The circuit 36 includes a first resistor R1, of the order of 100 ohms, a switch 40 and a second, optional resistor R2 of the order of 140 ohms.

When the machine is operating as a synchronous generator, the switch 40 is in the open position. Current from the exciter armature 18 is rectified by six diodes $D_1$–$D_6$ of the rotating rectifier assembly 22, and the resulting DC current circulates through the main generator field 26 in a counterclockwise direction with respect to FIG. 2. Due to an effectively zero impedance of the main generator field 26 to DC current, all of this circulating DC current circulates through the main generator field 26 rather than through the first resistor R1. The first resistor R1 operates to suppress the rate of rise of voltage across the main generator field 26 due to diode switching.

When the machine is operating as an induction motor, the switch 40 is closed. AC current induced in the main generator field 26 is conducted through the diodes $D_1$–$D_6$ and the switch 40 when circulating in the counterclockwise direction and shorts through the switch 40 when circulating in the clockwise direction with respect to FIG. 2. The current path through the switch 40 protects the diodes D1-D6 from a high reverse bias voltage.

The second resistor R2 is optional and is included to optimize motor starting characteristics. As is well known in the art, the specific resistance of the second R2 can be calculated based on desired motor starting characteristics.

Figure 3:
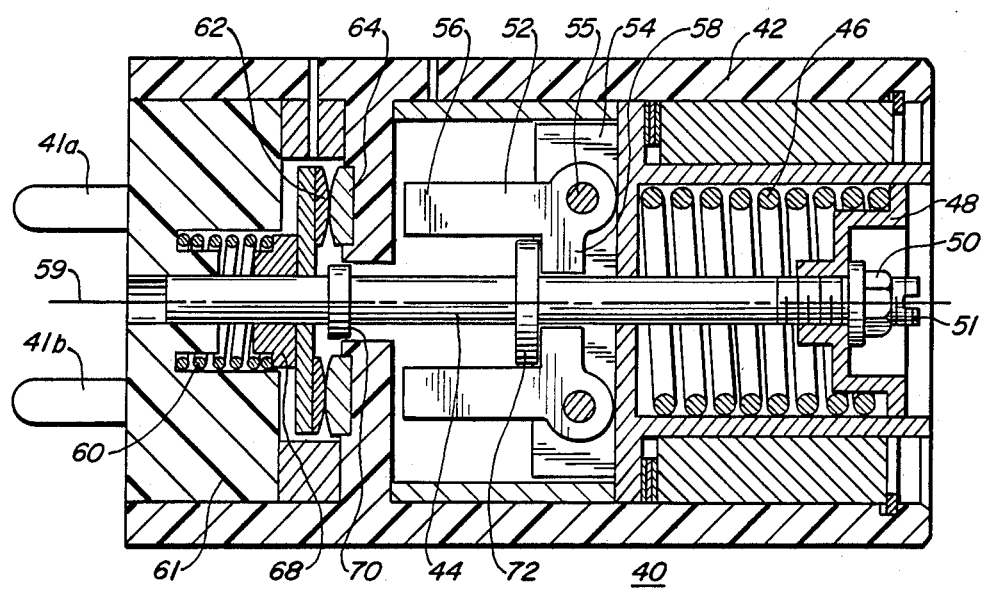
FIG. 3 is a sectional view of a centrifugal switch according to the present invention.

The switch 40 is illustrated in FIG. 3. The switch 40 is a centrifugally activated switch which is mounted on the rotor 29 and specifically, on the rotational axis 55 thereof. The switch 40 includes contactor pins 41a,b, a rotatable housing 42 and an axially movable shaft 44. A preload spring 46 is mounted on one end of the shaft 44 by a spring end cap 48 and a nut 50 threaded on the shaft 44. The shaft 44 has a slotted end 51 for receipt of a screw driver or the like whereby the position of the shaft 44 with respect to the nut 50 and the spring end cap 48 may be varied. This varies the degree to which the spring 46 is compressed, and thus the rightward bias applied by the spring 46 to the shaft 44. A pair of flyweights 52 is pivotably mounted to a support member 54 by pivot pins 55. The flyweights 52 have free ends 56, operator ends 58, and are displaced from the housing axis 59 which is located on the rotational axis of the rotor 29.

At the other end of the shaft 44 is a contact spring 60 seated in a contact spring housing 61, a movable contactor 62 and a stationary contactor 64. The movable contactor 62 moves into and out of a conducting contacting relationship with the stationary contactor 64 to make and break conduction between the contactor pins 41a,b respectively, thereby closing and opening the switch 40.

A contact spring slide 68 of insulating material is disposed between the contact spring 60 and the movable contactor 62 and about the shaft 44. A moving contact lobe 70 and a flyweight lobe 72 are disposed on the shaft 44. The moving contact lobe 70 is adjacent to the movable contactor 62 while the floyweight lobe 72 abuts the operator ends 58 of the flyweights 52.

The contact spring 60 is under compression, biasing the movable contactor 62 toward the stationary contactor 64. The preload spring 46 is also under compression, the preload spring compression being adjustable by rotation of the shaft 44 as mentioned previously. When the housing 42 is not rotating, the contactors 62 and 64 are in the closed position, and the contactor pins 41a,b are electrically connected.

To operate the machine as a motor, electrical power from the power supply 34 is applied to the main generator armature 28, inducing current in the main generator field 26. The contactors 62, 64 are in the closed position and allow this induced current to flow through the switch 40 and the second resistor R2, not exposing the first resistor R1 to the induced current. This induced current creates a torque in the rotor 30 to angularly accelerate it. Rotation of the rotor 30 causes the switch 40 to rotate. As the angular velocity of the rotor 30 increases due to acceleration, the free end 56 of each flyweight 52 sees a progressively increasing outward force due to centrifugal action upon its free end 56. This outward force creates a moment about the pivot pins 55 which transmit an axial force through the operator ends 58 of the flyweights 52 to the shaft 44 by means of the flyweight lobe 72. This force is in opposition to that applied to the shaft 44 by the preload spring 46 by means of the spring end cap 48 and the nut 50.

Upon obtaining a predetermined angular velocity, as determined by the initial compression of the preload spring 46, and as compression of the preload spring 46 continues, the flyweights 52 will move the flyweight lobe 72 axially to the left, driving the moving contact lobe 70 into contact with the movable contactor 62. Continued movement of the shaft 44 separates the moving contactor 62 from the stationary contactor 64 against the bias of the spring 60 and opens the circuit between contactor pins 41 a,b. Adjustment to the preload force and thus the angular velocity at which the foregoing occurs can be made by adjusting the shaft 44 relative to the nut 50.

Opening the switch 40 causes current to flow through the first resistor R1. At this stage, the current is only a fraction of what it is during initial start up of the rotation of the rotor, and therefore, the power handling capability of the first resistor R1 is sufficient. The machine may now be switched over to a power generation mode if desired.

When the generator is shut down, the angular velocity of the switch 40 decreases, relieving the centrifugal forces acting on the free end 56 of the flyweight 52, and ultimately the force presented by contact spring 60 and the preload spring 46 overcomes the centrifugal force of the flyweight 52, and the shaft 30 moves righwardly, bringing the contactors 62, 64 again into contact.

Typically, oil is circulated through the rotor 29 for lubrication and cooling. The present invention makes use of this circulating oil by providing oil admission ports 76 to direct oil through the switch 40 to extinguish any electrical arcing between the contactors as they are separated.

The shaft 44 is made of metal and the housing 42, the contact spring housing 61 and the contact spring spacer 68 are made of plastic, as for example, TORLON (trademark, Amoco Chemicals Corp.).

Because the movable contactor 62 is slidable on the shaft 44, the movable contactor 62 does not angularly slide against the stationary contactor 64 when they are in contact. Rather, they rotate together, eliminating any friction between the contactors 62, 64 and the maintenance problems associated therewith.

I claim:

1. A machine operable both as a synchronous generator for generating electricity and as an induction motor for accelerating the machine to synchronous speed, the machine comprising:
   a rotor;
   an exciter having a rotating exciter armature and a stationary exciter field;
   a main generator having a rotating main generator field and a stationary main generator armature;
   a rectifier assembly coupled between the exciter armature and the main generator field;
   a centrifugally activated switch for mounting on said rotor, said switch including,
   a housing,
   a shaft rotatable with the housing;
   an axially stationary contactor rotatable carried by said housing,
   an axially movable contactor slidably carried by said shaft housing, said axially movable contactor axially movable between first and second positions along said shaft, one of said positions being in nonsliding contact with said stationary contactor and the other of said positions being in non-contact with said stationary contactor;
   first means for axially biasing the movable contactor towards one of said positions; and
   second means for axially biasing the movable contactor towards the other of said positions in response to rotation of said housing to overcome said first biasing means when said housing reaches a predetermined angular velocity and move said movable contactor to said other position; and
   a circuit coupled between the rectifier assembly and the main generator field including a first resistor coupled across the main generator field in parallel with the switch.

2. The machine of claim 1 wherein said circuit includes a second resistor in series with said switch.

3. The machine of claim 1 wherein said first resistor has a finite current handling capability and said predetermined angular velocity is the angular velocity whereat the field current has diminished to a level below the current handling capability of said first resistor.

4. The machine of claim 1 including means for directing fluid through said switch facilitating extinguishment of any electrical arc created when said switch is opened.

5. A machine operable both as a synchronous generator for generating electricity and an induction motor for accelerating the machine to synchronous speed, the machine comprising:
   a rotor;
   an exciter having a rotating exciter armature and a stationary exciter field;
   a main generator having a rotating main generator field and a stationary main generator armature;
   a rectifier assembly coupled between the exciter armature and the main generator field;
   a centrifugally activated switch for mounting on said rotor, said switch including,
   first and second contactor pins;
   a housing;
   a shaft disposed axially through the center of the housing;
   an axially stationary contactor having a first portion coupled to said first contactor pin and a second portion, insulated from said first portion, and coupled to said second contactor pin;
   an axially movable contactor slidably carried by said shaft;
   a contact spring for biasing the movable contactor toward said stationary contactor;
   a flyweight rotatable with said shaft and having a free end and a pivotal end, said pivotal end including an actuator portion;
   a flyweight lobe on said shaft adjacent said flyweight actuator portion; and
   a preload spring disposed on said shaft under compression for biasing the movable contactor toward said stationary contactor, wherein said contact spring and preload spring maintain the movable contactor in contact with said stationary contactor until he housing exceeds a predetermined angular velocity at which time the centrifugal force on said free end of said flyweight is greater than the combined biasing of the contact spring and preload spring and the actuator portion of the flyweight operates on said flyweight lobe to axially move the shaft to move the movable contactor out of contact with said stationary contact; and
   a circuit coupled between the rectifier assembly and the main generator field including a resistor coupled across the main generator field in parallel with the switch.

6. The machine of claim 5 wherein said circuit further includes a second resistor in series with said switch.

7. The machine of claim 5 wherein said predetermined angular velocity is the angular velocity of the machine whereat operation switches between operation as an induction motor and operation as a synchronous generator.

8. The machine of claim 5 including means for directing fluid in said switch, said fluid facilitating extinguishment of any electrical arc created when said switch is opened.

* * * * *